(12) United States Patent
Nielsen

(10) Patent No.: US 12,736,122 B2
(45) Date of Patent: Sep. 15, 2026

(54) CAP FOR A ROBOT ARM

(71) Applicant: UNIVERSAL ROBOTS A/S, Odense S (DK)

(72) Inventor: Rasmus Borgbjerg Nielsen, Blommenslyst (DK)

(73) Assignee: UNIVERSAL ROBOTS A/S, Odense S (DK)

( * ) Notice: Subject to any disclaimer, the term of this patent is extended or adjusted under 35 U.S.C. 154(b) by 0 days.

(21) Appl. No.: 18/876,502

(22) PCT Filed: Jun. 13, 2023

(86) PCT No.: PCT/DK2023/050144
§ 371 (c)(1),
(2) Date: Dec. 18, 2024

(87) PCT Pub. No.: WO2023/246992
PCT Pub. Date: Dec. 28, 2023

(65) Prior Publication Data

US 2025/0230866 A1 Jul. 17, 2025

(30) Foreign Application Priority Data

Jun. 20, 2022 (DK) ............................. PA202270331

(51) Int. Cl.
*F16H 57/031* (2012.01)
*B25J 18/00* (2006.01)
*F16H 57/02* (2012.01)

(52) U.S. Cl.
CPC ............ *F16H 57/031* (2013.01); *B25J 18/00* (2013.01); *F16H 2057/02034* (2013.01); *F16H 2057/02073* (2013.01)

(58) Field of Classification Search
CPC ......... F16H 57/031; F16H 2057/02034; F16H 2057/02073; B25J 18/00; B25J 19/0075; B25J 9/009
See application file for complete search history.

(56) References Cited

U.S. PATENT DOCUMENTS 2,385,364 A * 9/1945 Larson .............. B60K 15/0406 16/373
3,476,266 A 11/1969 Devol
(Continued)

FOREIGN PATENT DOCUMENTS

CN 302213351 S 12/2012
CN 103250109 A 8/2013
(Continued)

OTHER PUBLICATIONS

Translation of WO 2023144943A1, obtained from fit database (Year: 2023).*

(Continued)

*Primary Examiner* — Thomas C Diaz
(74) *Attorney, Agent, or Firm* — ARENTFOX SCHIFF LLP

(57) ABSTRACT

The invention relates to as a cap removably connectable to a robot arm element, the robot arm element comprises a housing having an outer surface and an inner surface. The cap is removably connectable to the outer surface via an upper cavity connectable to an upper protrusion and via at least a first lower cavity connectable to a first lower protrusion. When the cap is connected to the robot arm element, the upper protrusion is fixed in an engaged position in the upper cavity and the first lower protrusion is fixed in an engaged position in the at least first lower cavity by a flexible suspension element.

41 Claims, 9 Drawing Sheets

SECTION A-A

(56) References Cited

Figure 1:
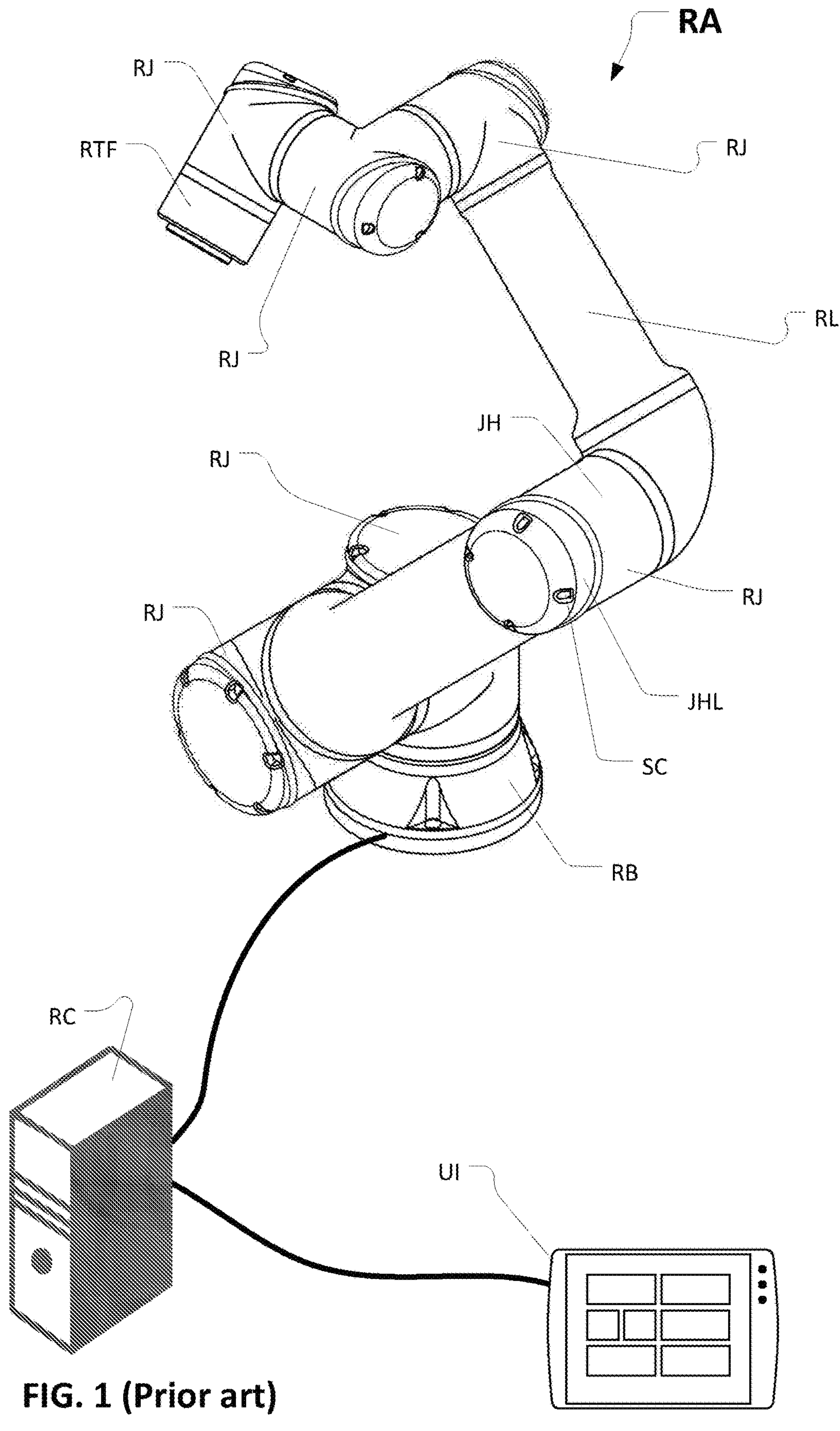

U.S. PATENT DOCUMENTS 4,166,543 A 9/1979 Dahlstrom
4,273,506 A 6/1981 Thomson et al.
4,398,110 A 8/1983 Flinchbaugh et al.
D274,182 S 6/1984 Kato
D279,571 S 7/1985 Arai et al.
D279,572 S 7/1985 Yasuoka et al.
4,678,952 A 7/1987 Peterson et al.
4,693,663 A 9/1987 Brenholt et al.
D293,449 S 12/1987 Kaufmann et al.
4,744,039 A 5/1988 Suzuki et al.
4,753,569 A 6/1988 Pryor
D298,834 S 12/1988 Jones et al.
4,817,017 A 3/1989 Kato
5,103,941 A 4/1992 Vranish
5,155,423 A 10/1992 Karlen et al.
5,220,261 A 6/1993 Kempas
5,293,107 A 3/1994 Akeel
5,341,289 A 8/1994 Lee
5,353,386 A 10/1994 Kasagami et al.
5,495,410 A 2/1996 Graf
5,782,571 A 7/1998 Hufford et al.
5,880,956 A 3/1999 Graf
6,040,109 A 3/2000 Coppens et al.
6,041,274 A 3/2000 Onishi et al.
D423,534 S 4/2000 Raab et al.
6,070,109 A 5/2000 McGee et al.
6,131,296 A 10/2000 Faeger
6,292,715 B1 9/2001 Rongo
6,408,224 B1 6/2002 Okamoto et al.
6,519,860 B1 2/2003 Bieg et al.
6,535,794 B1 3/2003 Raab
6,550,346 B2 4/2003 Gombert et al.
D482,103 S 11/2003 Snyder et al.
6,704,619 B1 3/2004 Coleman et al.
6,822,412 B1 11/2004 Gan et al.
6,837,892 B2 1/2005 Shoham
6,847,922 B1 1/2005 Wampler, II
6,856,863 B1 2/2005 Sundar
6,922,610 B2 7/2005 Okamoto et al.
6,996,456 B2 2/2006 Cordell et al.
7,248,012 B2 7/2007 Takahashi et al.
7,272,524 B2 9/2007 Torgny
7,278,222 B2 10/2007 Maier
7,298,385 B2 11/2007 Kazi et al.
7,300,240 B2 11/2007 Torgny
7,571,025 B2 8/2009 Bischoff
7,643,907 B2 1/2010 Fuhlbrigge et al.
D610,926 S 3/2010 Gerent et al.
7,756,608 B2 7/2010 Torgny
D634,818 S 3/2011 Leroyer
D637,283 S 5/2011 Selvarajan et al.
D643,319 S 8/2011 Ferrari et al.
8,002,716 B2 8/2011 Jacobsen et al.
8,050,797 B2 11/2011 Lapham
8,160,205 B2 4/2012 Saracen et al.
8,255,462 B2 8/2012 Kondo
8,301,421 B2 10/2012 Bacon et al.
D670,319 S 11/2012 Liu et al.
8,340,820 B2 12/2012 Nair
D677,294 S 3/2013 Long
8,410,732 B2 4/2013 Kassow et al.
8,425,620 B2 4/2013 Johnson et al.
8,457,786 B2 6/2013 Andersson
8,525,460 B2 9/2013 Reiland et al.
D692,041 S 10/2013 Selic et al.
8,571,706 B2 10/2013 Zhang et al.
8,571,711 B2 10/2013 Jacobsen et al.
8,614,559 B2 12/2013 Kassow et al.
8,756,973 B2 6/2014 Wallace et al.
8,774,965 B2 7/2014 Weiss et al.
8,779,715 B2 7/2014 Kassow et al.
8,812,155 B2 8/2014 Brethe
D716,357 S 10/2014 Gombert
D740,371 S 10/2015 Ries
9,248,573 B2 2/2016 Søe-Knudsen et al.
D763,337 S 8/2016 Ries
D763,338 S 8/2016 Ries
D763,339 S 8/2016 Ries
D766,348 S 9/2016 Long
D776,178 S 1/2017 Ries
D782,553 S 3/2017 Goto et al.
D785,161 S 4/2017 Dravitzki et al.
D802,041 S 11/2017 He et al.
9,833,897 B2 12/2017 Søe-Knudsen et al.
10,022,861 B1 7/2018 He et al.
D824,977 S 8/2018 Everman
D827,005 S 8/2018 Huang et al.
D827,006 S 8/2018 Lin et al.
D830,439 S 10/2018 Park et al.
D837,294 S 1/2019 Ciniello et al.
D837,853 S 1/2019 Deng et al.
D841,065 S 2/2019 Hontani et al.
D841,710 S 2/2019 Klassen
D841,712 S 2/2019 Hontani et al.
D852,862 S 7/2019 Dosho et al.
10,343,277 B2 7/2019 Gombert et al.
10,399,232 B2 9/2019 Oestergaard et al.
10,399,616 B2 9/2019 Ellerman et al.
D865,828 S 11/2019 Bogart et al.
D873,878 S 1/2020 Vazquez
D874,530 S 2/2020 Haddadin et al.
D890,238 S 7/2020 Lundbck et al.
D892,885 S 8/2020 Corkum et al.
D893,571 S 8/2020 Everman
D895,704 S 9/2020 Johansen
D895,705 S 9/2020 Johansen
D895,706 S 9/2020 Johansen
D898,090 S 10/2020 Johansen
D906,392 S 12/2020 Wappler et al.
10,850,393 B2 12/2020 Oestergaard et al.
D912,117 S 3/2021 Berkowitz et al.
D914,781 S 3/2021 Everman
D915,487 S 4/2021 Sell
D919,688 S 5/2021 Takagi et al.
D921,733 S 6/2021 Li et al.
D923,679 S 6/2021 Wappler et al.
D924,228 S 7/2021 Mirth
D932,485 S 10/2021 Mirth
D932,486 S 10/2021 Mirth
D932,487 S 10/2021 Mirth
D932,530 S 10/2021 Laplante et al.
D933,421 S 10/2021 Kim et al.
D935,502 S 11/2021 Yamashiro et al.
D938,505 S 12/2021 Yamashiro et al.
11,260,543 B2 3/2022 Johansen
D949,941 S 4/2022 Thilo
D958,859 S 7/2022 Picard et al.
D963,852 S 9/2022 Rotem et al.
11,474,510 B2 10/2022 Oestergaard et al.
D970,015 S 11/2022 Cha et al.
D979,624 S 2/2023 Kwon et al.
D979,626 S 2/2023 Picard et al.
D985,642 S 5/2023 Wappler et al.
11,648,666 B2 5/2023 Dan
11,796,045 B2 10/2023 Johansen
D1,006,081 S 11/2023 Rouayroux et al.
11,820,011 B2 * 11/2023 Caron ...................... B25J 18/00
D1,007,551 S 12/2023 Chen et al.
D1,008,327 S 12/2023 Von Stuermer
D1,008,328 S 12/2023 Wappler et al.
11,839,979 B2 12/2023 Rosenlund et al.
D1,012,144 S 1/2024 Duerr et al.
D1,012,145 S 1/2024 Zhu et al.
D1,012,146 S 1/2024 Duerr et al.
D1,020,828 S 4/2024 Wappler et al.
11,964,389 B2 4/2024 Johansen
12,011,824 B2 6/2024 Vraa et al.
D1,049,189 S 10/2024 Von Stuermer
D1,050,212 S 11/2024 Von Stuermer
D1,059,450 S 1/2025 Wappler et al.
D1,061,654 S 2/2025 Wappler et al.
D1,099,188 S 10/2025 Sotobayashi et al.
12,508,711 B2 12/2025 Kravchenko et al.
2002/0013675 A1 1/2002 Knoll et al.

(56) References Cited

U.S. PATENT DOCUMENTS

| | | | |
|---|---|---|---|
| 2003/0120391 A1 | 6/2003 | Saito | |
| 2004/0078114 A1 | 4/2004 | Cordell et al. | |
| 2004/0172164 A1 | 9/2004 | Habibi et al. | |
| 2004/0189631 A1 | 9/2004 | Kazi et al. | |
| 2004/0212626 A1 | 10/2004 | Lyxzen et al. | |
| 2005/0080515 A1 | 4/2005 | Watanabe et al. | |
| 2005/0247155 A1 | 11/2005 | Liu | |
| 2005/0267637 A1 | 12/2005 | Lapham | |
| 2005/0273198 A1 | 12/2005 | Bischoff | |
| 2006/0069466 A1 | 3/2006 | Kato et al. | |
| 2006/0125806 A1 | 6/2006 | Voyles et al. | |
| 2006/0163939 A1 | 7/2006 | Kuramochi et al. | |
| 2006/0178775 A1 | 8/2006 | Zhang et al. | |
| 2008/0004632 A1 | 1/2008 | Sutherland et al. | |
| 2008/0140258 A1 | 6/2008 | Ueno et al. | |
| 2008/0188983 A1 | 8/2008 | Ban et al. | |
| 2008/0188986 A1 | 8/2008 | Hoppe | |
| 2008/0216596 A1 | 9/2008 | Madhani et al. | |
| 2008/0319557 A1 | 12/2008 | Summers et al. | |
| 2009/0076655 A1 | 3/2009 | Blondel et al. | |
| 2009/0157226 A1 | 6/2009 | De Smet | |
| 2009/0259337 A1 | 10/2009 | Harrold et al. | |
| 2009/0289591 A1 | 11/2009 | Kassow et al. | |
| 2010/0241270 A1 | 9/2010 | Eliuk et al. | |
| 2011/0022216 A1 | 1/2011 | Andersson | |
| 2011/0064554 A1 | 3/2011 | Ito et al. | |
| 2011/0154933 A1 | 6/2011 | Liu et al. | |
| 2011/0232411 A1 | 9/2011 | Long | |
| 2011/0290059 A1 | 12/2011 | Pan | |
| 2011/0290060 A1 | 12/2011 | Long | |
| 2012/0048051 A1 | 3/2012 | Long | |
| 2012/0085191 A1 | 4/2012 | Long | |
| 2012/0210817 A1 | 8/2012 | Kassow et al. | |
| 2013/0047771 A1 | 2/2013 | Liu et al. | |
| 2013/0068060 A1 | 3/2013 | Xu et al. | |
| 2013/0079928 A1 | 3/2013 | Soee-Knudsen et al. | |
| 2013/0081502 A1 | 4/2013 | Long | |
| 2013/0118286 A1 | 5/2013 | Long | |
| 2013/0125694 A1 | 5/2013 | Long | |
| 2013/0125696 A1 | 5/2013 | Long | |
| 2013/0145891 A1 | 6/2013 | Long | |
| 2013/0231778 A1 | 9/2013 | Hallundbaek | |
| 2013/0255426 A1 | 10/2013 | Kassow et al. | |
| 2013/0340560 A1 | 12/2013 | Burridge et al. | |
| 2014/0116182 A1 | 5/2014 | Long | |
| 2014/0290418 A1 | 10/2014 | Long | |
| 2015/0050069 A1 | 2/2015 | Pannekoek et al. | |
| 2015/0224640 A1 | 8/2015 | Vu et al. | |
| 2015/0369277 A1 | 12/2015 | Fevre et al. | |
| 2016/0327383 A1 | 11/2016 | Becker et al. | |
| 2016/0331482 A1 | 11/2016 | Hares | |
| 2017/0225341 A1 | 8/2017 | Kerestes et al. | |
| 2018/0207795 A1* | 7/2018 | Haddadin | B25J 9/0009 |
| 2020/0171658 A1 | 6/2020 | Kielsholm Thomsen | |
| 2021/0086374 A1 | 3/2021 | Brandt et al. | |
| 2021/0114235 A1 | 4/2021 | Kurek | |
| 2021/0268646 A1* | 9/2021 | Wakana | B25J 19/023 |
| 2022/0161433 A1 | 5/2022 | Beck et al. | |
| 2022/0184810 A1 | 6/2022 | Beck et al. | |
| 2022/0226993 A1 | 7/2022 | Madsen | |
| 2022/0379463 A1 | 12/2022 | Hansen | |
| 2022/0379468 A1 | 12/2022 | Hansen | |
| 2022/0388156 A1 | 12/2022 | Hansen | |
| 2023/0035296 A1 | 2/2023 | Søe-Knudsen et al. | |
| 2023/0052996 A1 | 2/2023 | Thomsen | |
| 2023/0191603 A1 | 6/2023 | Thomsen et al. | |
| 2023/0405819 A1 | 12/2023 | Kravchenko et al. | |
| 2023/0405822 A1 | 12/2023 | Kravchenko et al. | |
| 2023/0418258 A1 | 12/2023 | Mirth | |
| 2024/0134388 A1 | 4/2024 | Sterling | |
| 2024/0351209 A1 | 10/2024 | Graabk et al. | |
| 2025/0296223 A1 | 9/2025 | Inomata et al. | |
| 2025/0375906 A1 | 12/2025 | Nielsen et al. | |

FOREIGN PATENT DOCUMENTS

| | | | | |
|---|---|---|---|---|
| CN | 111791263 A | | 10/2020 | |
| CN | 112476475 A | | 3/2021 | |
| CN | 309155403 S | | 3/2025 | |
| DE | 2735632 A1 | | 2/1978 | |
| DE | 19858154 A1 | | 6/2000 | |
| DE | 10048096 A1 | | 4/2002 | |
| DE | 10157174 A1 | | 6/2003 | |
| DE | 10239694 A1 | | 3/2004 | |
| DE | 102006061752 A1 | | 7/2008 | |
| DE | 102008027008 A1 | | 12/2009 | |
| DE | 102008059505 A1 | | 6/2010 | |
| DE | 102020129796 A1 | * | 5/2021 | B25J 19/00 |
| DK | 009062896-0001 | | 7/2022 | |
| DK | 009062896-0002 | | 7/2022 | |
| DK | 009062896-0003 | | 7/2022 | |
| DK | 202270331 A1 | | 2/2024 | |
| DK | 181635 B1 | | 8/2024 | |
| EP | 1505464 A2 | | 2/2005 | |
| EP | 1696289 A1 | | 8/2006 | |
| EP | 1724676 A1 | | 11/2006 | |
| EP | 2258521 A1 | | 12/2010 | |
| EP | 2453325 A1 | | 5/2012 | |
| EP | 2641136 A1 | | 9/2013 | |
| EP | 3015932 A1 | | 5/2016 | |
| EP | 3331666 A1 | | 6/2018 | |
| ES | 2548037 T3 | | 10/2015 | |
| GB | 6136193 | | 9/2021 | |
| IN | 298882 | | 10/2017 | |
| JP | 01-146645 A | | 6/1989 | |
| JP | 02-250782 A | | 10/1990 | |
| JP | 06-190753 A | | 7/1994 | |
| JP | 10-254527 A | | 9/1998 | |
| JP | 2001-050741 A | | 2/2001 | |
| JP | 2002-120174 A | | 4/2002 | |
| JP | 2004-049731 A | | 2/2004 | |
| JP | 2004-148466 A | | 5/2004 | |
| JP | 2004-316722 A | | 11/2004 | |
| JP | 2005-148789 A | | 6/2005 | |
| JP | 2005-342885 A | | 12/2005 | |
| JP | 1754355 S | | 10/2023 | |
| MX | 2013005425 A | | 8/2013 | |
| RU | 2013125348 A | | 12/2014 | |
| WO | 97/00454 A1 | | 1/1997 | |
| WO | 2004/071717 A1 | | 8/2004 | |
| WO | 2007/099511 A2 | | 9/2007 | |
| WO | 2009/107358 A1 | | 9/2009 | |
| WO | 2012/066025 A1 | | 5/2012 | |
| WO | 2017/029263 A1 | | 2/2017 | |
| WO | WO-2021144969 A1 | * | 7/2021 | B25J 9/08 |
| WO | WO-2023144943 A1 | * | 8/2023 | B25J 19/00 |
| WO | 2023/246992 A1 | | 12/2023 | |

OTHER PUBLICATIONS

International Preliminary Report on Patentability received for PCT Patent Application No. PCT/DK2023/050144, mailed on Dec. 18, 2024, 10 pages.

International Search Report and Written Opinion received for PCT Patent Application No. PCT/DK2023/050144, mailed on Nov. 20, 2023, 14 pages.

Search Report and search opinion received for Danish Patent Application No. PA 202270331 mailed on Dec. 20, 2022, 9 pages.

Search Report received for Danish Patent Application No. PA 202270331, mailed on Jun. 29, 2023, 3 pages.

Universal Robots., "User Manual UR3/CB3", Version 3.1, 2009, 181 pages.

Non-Final Office Action received for U.S. Appl. No. 29/823,113, mailed on Mar. 6, 2024, 7 pages.

Office Action received for Chinese Application No. 202230446399.1, mailed on Jul. 19, 2024, 2 pages of Original Document only.

Office Action received for Chinese Patent Application No. 202230446399.1, mailed on Dec. 20, 2023, 2 pages of Original Document only.

(56) References Cited

OTHER PUBLICATIONS

Office Action received for Chinese Patent Application No. 202230446399.1, mailed on Jul. 20, 2023, 2 pages of Original Document only.
Office Action received for Chinese Patent Application No. 202230446407.2, mailed on Jan. 11, 2024, 2 pages of Original Document only.
Office Action received for Chinese Patent Application No. 202230446407.2, mailed on Jul. 19, 2024, 4 pages of Original Document only.
Office Action received for Chinese Patent Application No. 202230446407.2, mailed on Jul. 20, 2023, 2 pages of Original Document only.
Office Action received for Chinese Patent Application No. 202230446413.8, mailed on Feb. 19, 2024, 1 page of Original Document only.
Office Action received for Chinese Patent Application No. 202230446413.8, mailed on Jul. 20, 2023, 1 page of Original Document Only.
Office Action received for Chinese Patent Application No. 202230493454.2, mailed on Feb. 19, 2024, 2 pages of Original Document only.
Office Action received for Chinese Patent Application No. 202230493454.2, mailed on Jul. 20, 2023, 4 pages of Original Document only.
Restriction Requirement received for U.S. Appl. No. 29/823,114, mailed on Mar. 6, 2024, 8 pages.
Restriction Requirement received for U.S. Appl. No. 29/823,146, mailed on Mar. 19, 2024, 10 pages.
Universal Robots, "Compatibility of joints (CB-Series CB3 and e-Series)", Available online at: <https://www.universal-robots.com/arlicles/ur/robot-care-maintenance/compatibility-of-joints-cb-series-cb3-and-e-series/>, 2024, pp. 1-16.
Universal Robots, "Universal Robots e-Series User Manual, UR5e", Version 5.0.2, 2018, 205 pages.
Universal Robots, "UR10/CB3 User Manual", Version 3.1 (rev. 17782), 2015, 179 pages.
Universal Robots, "UR20", Available online at: <https://www.universal-robots.com/products/ur20-robot/>, 2024, 1 page.
Universal Robots, "UR5/CB3 User Manual", Version 3.0 (rev. 15965), 2014, 173 pages.
universal-robots.com, "Robotic Arm", Available at: <https://www.universal-robots.com/in/blog/robotic-arm/>, Nov. 9, 2022, 6 pages.
youtube.com, "Collaborative Robots in Australia from Universal Robots", Scott Automation Robotics, Available at: <https://www.youtube.com/watch?v=15K7iUfazjk>, Feb. 16, 2016, 1 page.

* cited by examiner

SECTION A-A

SECTION B-B

Figure 3A:
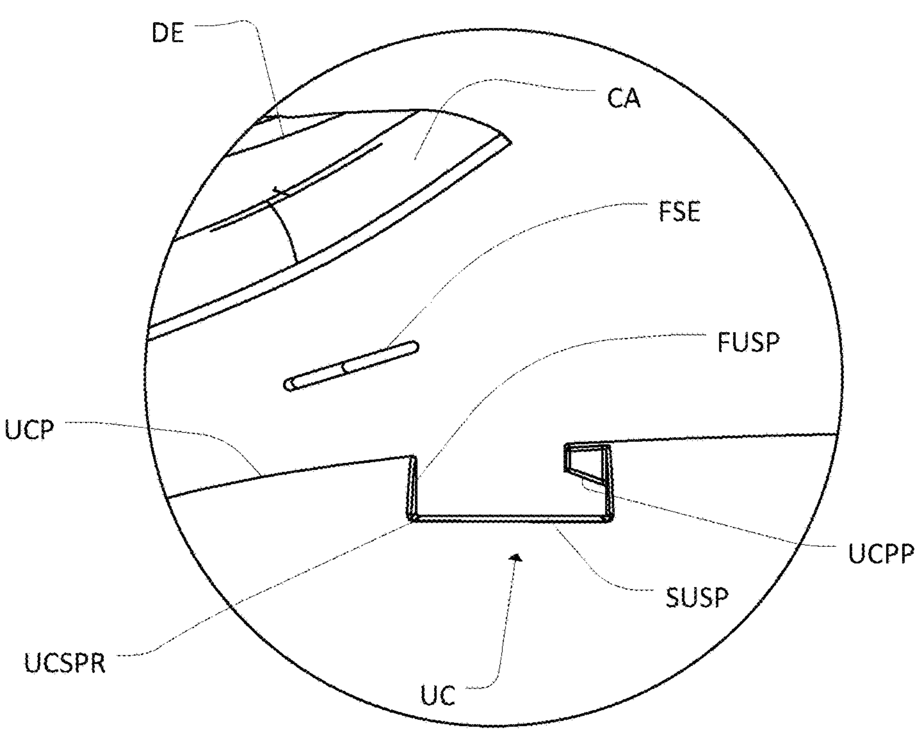

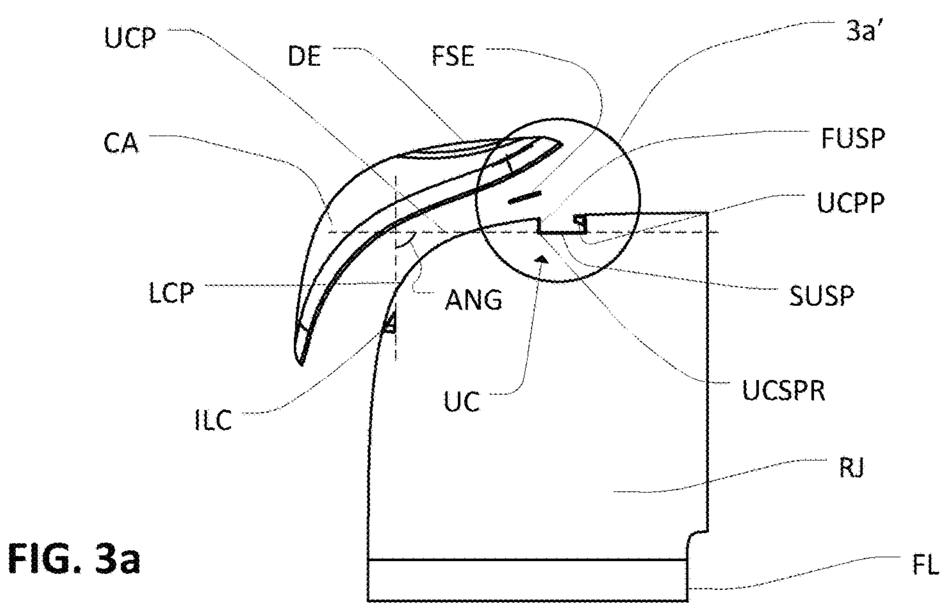
FIG. 3a
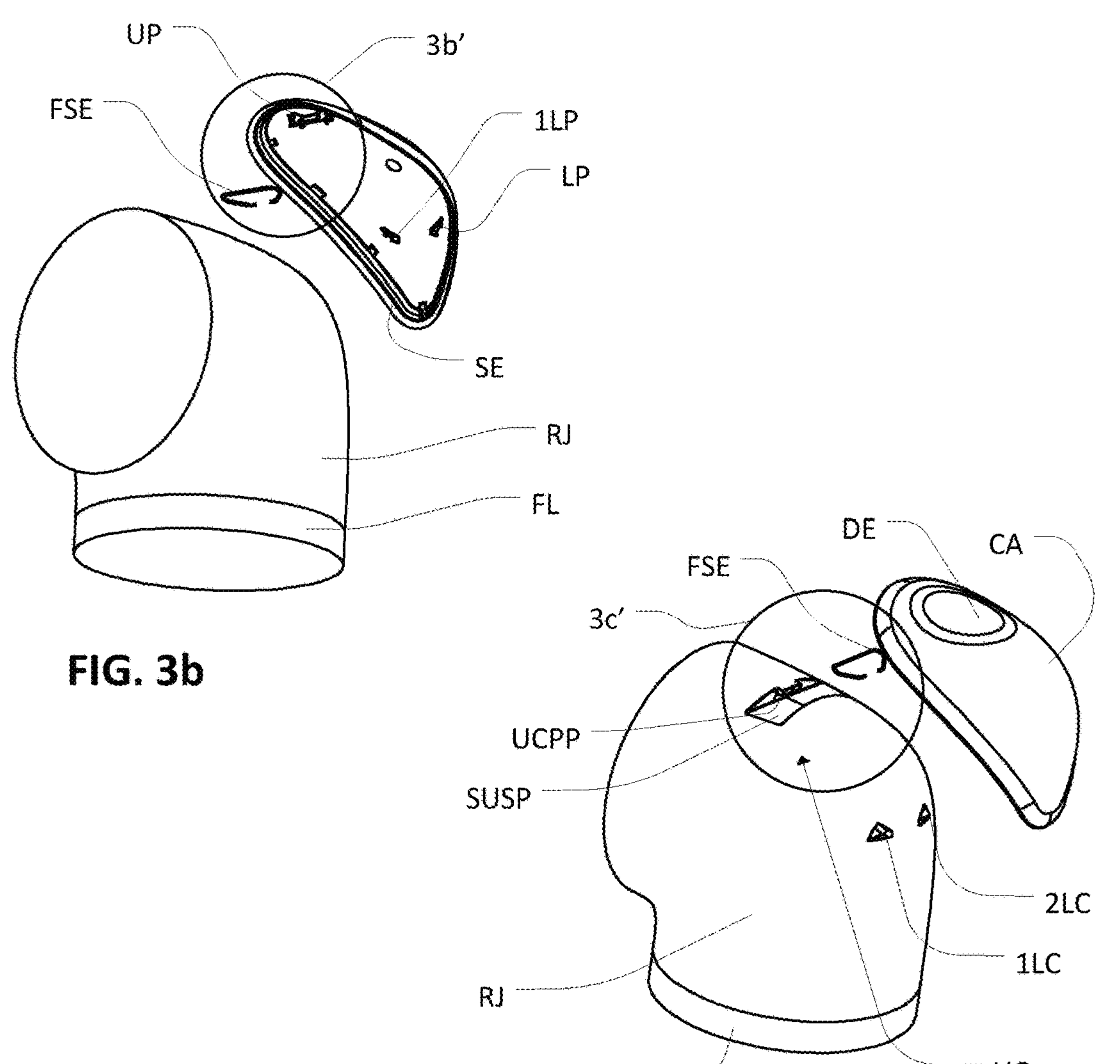
FIG. 3b
FIG. 3c

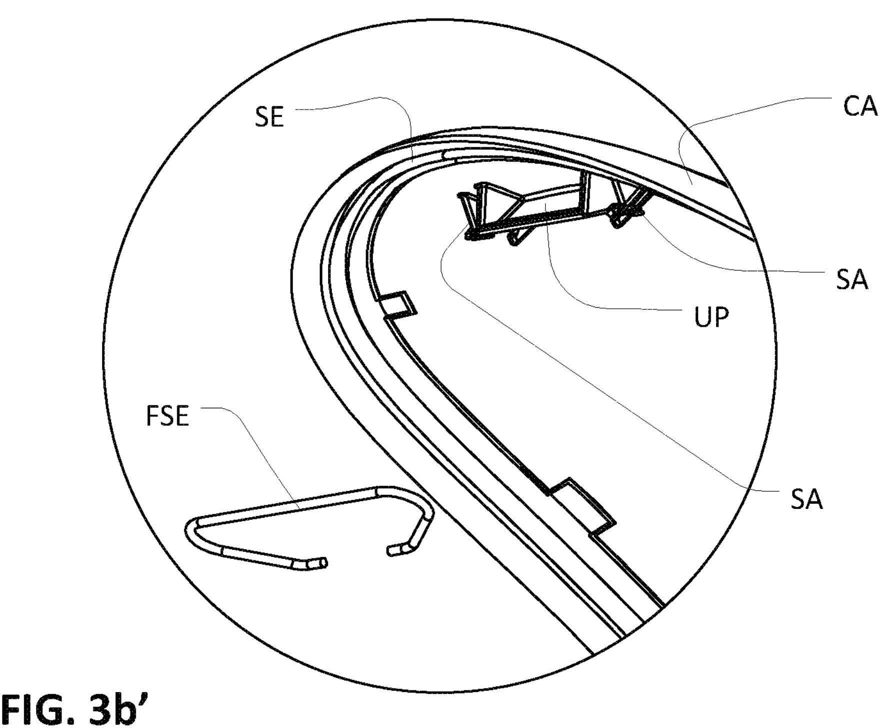
FIG. 3b’
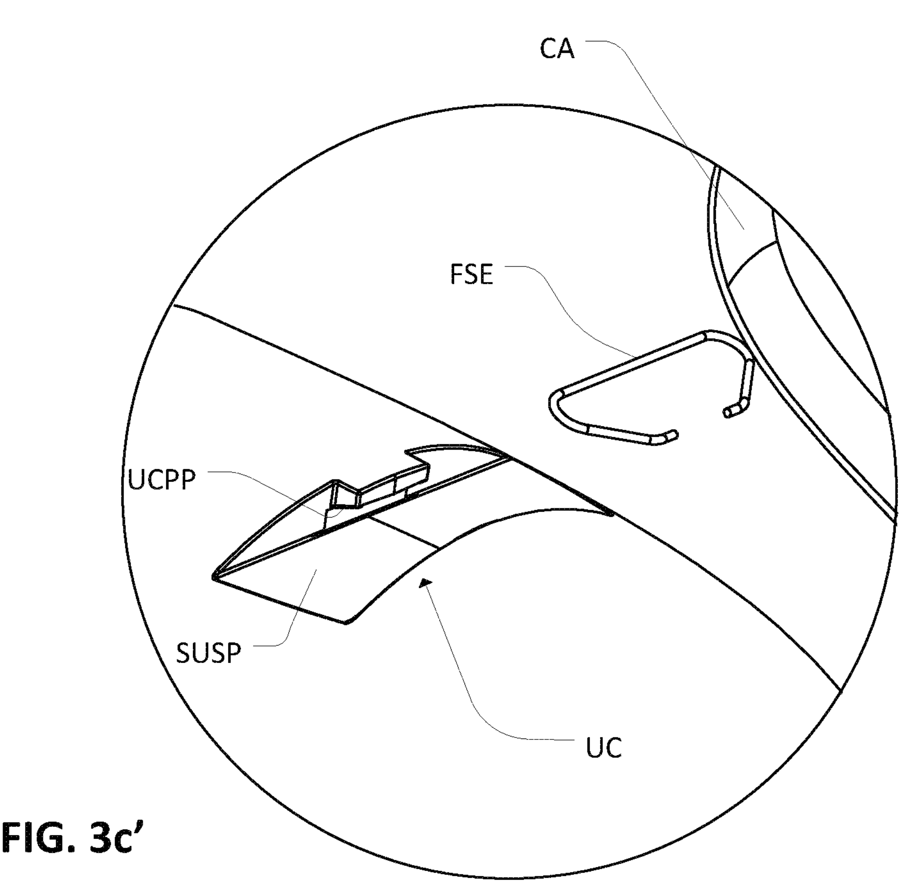
FIG. 3c’

CAP FOR A ROBOT ARM

This application is a U.S. national stage entry of PCT application no. PCT/DK2023/050144 which was filed on Jun. 13, 2023. PCT application no. PCT/DK2023/050144 claims priority to Denmark patent application no. PA202270331 which was filed on Jun. 20, 2022. This application claims priority to both PCT application no. PCT/DK2023/050144 and to Denmark patent application no. PA202270331. Both PCT application no. PCT/DK2023/050144 and Denmark patent application no. PA202270331 are incorporated into this this application by reference.

FIELD OF THE INVENTION

The present invention relates to a cap connectable to a robot arm and a method of connecting the cap to the robot arm.

BACKGROUND OF THE INVENTION

In the art robot arm joints enclose joint electronics and joint mechanics in a housing closed by a lid. The lid is screwed to the housing leading to problems of holes for the screws collecting dust and dirt which is not acceptable in certain industries such as clean room applications, pharma industry and/or the medical technology industry.

In the art an example hereof is CN111791263 which disclose a steering engine module for a robot arm, the module comprises a shell in which a control assembly and two steering engines are mounted. The control assembly is accessible by removing a closing cover.

Robot arm joints formed by two separate joint pieces which when screwed together are forming the robot joint is known in the art e.g. from EP3331666. Such robot arm joint does not need a lid for covering an opening in robot arm joint and thus have no holes/screws for attaching such lid to the robot arm joint.

SUMMARY OF THE INVENTION

The inventor has identified the above-mentioned problems and challenges related to attaching a cap to a robot arm such as to a robot arm joint and have solved these problems by the present invention as described below. Hence, by the present invention, it is now possible to add or replace a cap and thereby change aesthetic appearance of the robot arm and thereby signal a predetermined statement, opinion, branding, or the like.

[¶TAA] In an aspect, the invention relates to as cap removably connectable to a robot arm element, said robot arm element comprises a housing having an outer surface and an inner surface, wherein said cap is removably connectable to said outer surface via an upper cavity connectable to an upper protrusion and via at least a first lower cavity connectable to a first lower protrusion, wherein, when said cap is connected to said robot arm element, said upper protrusion is fixed in an engaged position in said upper cavity and said first lower protrusion is fixed in an engaged position in said at least first lower cavity by a flexible suspension element.

By forming cavities in one of the robot arm element or cap and forming protrusions in one of the robot arm element or cap it is possible to attach a cap to a robot arm element. The way of attaching according to the present invention is advantageous in that it can be made with one hand, without the need of any screws or other loose parts which may be lost and in that it can be disassembled with only one hand. Attaching a cap to a robot arm is very advantageous to be able to distinguish one robot arm from another robot arm. Hence, the branding value of a cap according to the present invention including brand specific characteristics is priceless.

A robot arm element includes a robot base, a plurality of robot arm joints (simply referred to as joint or robot joint) interconnectable via links, these links and a robot tool flange. The upper part of e.g. a robot joint is the part of the joint that is towards the robot tool flange and the lower part is the part of the joint that is towards the robot base.

A cap should be understood a covering structure intended to cover at least a part of the outer surface of the robot arm.

According to an advantageous embodiment of the invention, said robot arm element is a robot joint or a robot link.

Typically, the cap is connectable to a robot joint, but could in principle also be connected to e.g. a robot arm link connecting two robot joints, a robot base, robot tube, etc. Note that sometimes, a robot link comprise a tube with a robot link connected to each of its ends and other times a robot link comprise two robot joints.

According to an advantageous embodiment of the invention, said robot joint is formed by a single hollow tubular element having only two openings.

Such robot joint is advantageous in that it is compact and thus stronger and more rigid. In its most simple implementation, such robot joint does not need an additional outer elements. However, as described above for the sake of identification, the robot joint may be equipped with a detectable cap carrying a logo, colour, ornament, and/or the like.

According to an advantageous embodiment of the invention, said cap is a robot arm identification cap.

Attaching a cap to a robot joint via which the robot arm is identifiable is advantageous in that it has the effect, that the robot arm carrying the cap visually stands out from other robot arm and thereby strengthen the value of the brand associated with the cap.

The cap may be a decorative cap having a light blue or other colours, carrying a trademark from the robot arm manufacture, etc.

According to an advantageous embodiment of the invention, at least a part of said cap follows the outer curvature of said robot arm element.

When the robot arm element is a robot joint, a cap following the robot joint will follow the curvature of the joint i.e. the cap will define part of a circular shape, the same circular shape defined by the robot joint. Depending on where exactly the cap is attached to the robot arm joint, a larger or minor part of the cap is curved. Hence, one part of the cap may be straight, and one part of the cap may be curved.

According to an advantageous embodiment of the invention, said cap comprises a seal.

A seal is advantageous in that it ensures a tight connection between the robot arm joint outer surface and the cap. Thereby rubbing of two rigid elements (joint and cap) is prevented, a flexible connection between joint and cap is obtained, and a sealed space is established between the outer surface of the joint and the inner surface of the cap. Hence, no dust is present in this space which is advantageous if a e.g. an electric connector to joint electronics/joint mechanics is available.

According to an advantageous embodiment of the invention, said cap include a universal attachment arrangement.

A universal attachment arrangement such as a threated rod, screw eye, magnet or the like is advantageous in that it has the effect that cables, tubes and the like is attachable to the robot arm via the cap.

The universal attachment arrangement may be anchored in the robot arm joint and just pass through the cap via a hole in the cap. This is advantageous in that the universal attachment arrangement may carry a greater load than if it is only anchored in the cap is self.

According to an advantageous embodiment of the invention, said cap is shock absorbing.

According to an advantageous embodiment of the invention, said cap is made of Acrylonitrile Butadiene Styrene, Polycarbonate or Polylactic acid.

According to an advantageous embodiment of the invention, the width of said cap is less than the diameter of the robot arm joint.

A cap having a width less than the diameter of the joint is not suitable as a robot arm lid as it cannot cover the entire opening of the robot arm joint.

According to an advantageous embodiment of the invention, said upper cavity is formed in said robot arm joint extending into the interior of the robot arm joint.

The upper cavity is visible as a protruding part extending from the inner surface of the material forming the robot arm joint. Accordingly, it is visible inside the robot arm joint and thus have to be located where space is not occupied by joint electronics or joint mechanics.

According to an advantageous embodiment of the invention, said upper cavity comprise an upper cavity protruding part.

The upper cavity protruding part is advantageous in that in the engaged position, it is arranged to engage with an upper protrusion of the cap and thereby at least partly ensuring connectivity of the cap to the robot arm joint.

According to an advantageous embodiment of the invention, said upper cavity comprise an upper cavity suspension rest part formed by a first upper cavity part and a second upper cavity part.

The upper cavity is formed by at least a first upper cavity part and a second upper cavity part. The first and second upper cavity parts meet in a point which may be referred to as the upper cavity suspension rest part i.e. where the flexible suspension element rests when the cap is attached to the robot arm joint.

According to an advantageous embodiment of the invention, said upper protrusion is part of said cap.

According to an advantageous embodiment of the invention, said first lower cavity is formed in said robot arm joint.

According to an advantageous embodiment of the invention, said robot arm joint further comprises a second lower cavity.

Having both a first and a second lower cavity is advantage in that connection of the cap to the robot joint is stronger and alignment of the cap to the desired position on the robot joint may be easier.

According to an advantageous embodiment of the invention, said first lower cavity and/or said second lower cavity is formed in said robot arm joint, where said robot arm joint, on its inner surface, comprise a screw tower.

Locating the lower cavities where the housing of the robot joint comprises a screw tower is advantageous in that that the lower cavities does not take up space inside the robot joint. Hence, leaving more space to the joint electronics and joint mechanics.

According to an advantageous embodiment of the invention, said first lower protrusion is part of said cap.

According to an advantageous embodiment of the invention, said second lower protrusion is part of said cap.

According to an advantageous embodiment of the invention, an angle between a lower cavity plane and an upper cavity plane is between 80 degrees and 125 degrees.

According to an advantageous embodiment of the invention, the part of said upper protrusion and of said upper cavity protruding part engaging each other when said cap is in engaging position are adapted to each other so as to facilitate alignment of said cap with said robot arm element.

This way of aligning the physical positioning of the cap e.g. to the robot joint is advantageous in that it is performed automatically, when the cap is positioned on the robot joint. Hence, the cavities functions as guides for the protrusions ensuring correct location of the cap.

It should be mentioned that the upper cavity and lower cavities may also be formed in the cap. In this situation, the upper protrusion and the lower protrusions are part of the robot joint.

According to an advantageous embodiment of the invention, said flexible suspension element is a spring.

[¶BB] According to an advantageous embodiment of the invention, said flexible suspension element is rotatable mounted in said cap.

¶EE This is advantageous in that it has the effect, that once force is applied to e.g. a spring, the cap can be displaced so that the upper protrusion engages with the upper cavity protruding part and thereby connects the cap to the robot joint.

According to an advantageous embodiment of the invention, said cap is removably connectable to a robot arm element according to any of the paragraphs ¶AA to ¶BB above is applied to a robot arm element according to the method specified in any of the paragraphs ¶CC to ¶DD below.

¶CC Moreover, in an aspect, the invention relates to a method of applying a cap to a robot arm element, the method comprising the steps of:

- providing a cap and a robot arm element, wherein said cap or said robot arm element comprising
  - a flexible suspension element, an upper protrusion and a first lower protrusion, an upper cavity and a first lower cavity, wherein said upper cavity comprising an upper cavity protruding part,
- applying said flexible suspension element in an upper cavity suspension rest part of said upper cavity,
- applying a force to said flexible suspension element towards said upper cavity suspension rest part,
- engaging said upper protrusion with said upper cavity protruding part and engaging said first lower protrusion with said first lower cavity, and
- releasing said force allowing said flexible suspension element to maintain an engaged position of said upper protrusion against said upper cavity protruding part and of said first lower protrusion in said first lower cavity.

Moreover, in an aspect, the invention relates to a method of applying a cap to a robot arm element, the method comprising the steps of:

- providing a cap comprising a flexible suspension element, an upper protrusion and a first lower protrusion,
- providing a robot arm element comprising an upper cavity and a first lower cavity, wherein said upper cavity comprising an upper cavity protruding part,
- applying said flexible suspension element in an upper cavity suspension rest part of said upper cavity,
- applying a force to said flexible suspension element via said cap towards said upper cavity suspension rest part, engaging said upper protrusion with said upper cavity protruding part and engaging said first lower protrusion with said first lower cavity, and releasing said force allowing said flexible suspension element to maintain an engaged position of said upper protrusion against said upper cavity protruding part and of said first lower protrusion in said first lower cavity.

The method is advantageous in that it enables changing aesthetic appearance of a robot arm. Hence, during one period the robot arm may symbolise a particular political standpoint by e.g. a specific combination of colours, during another period the robot arm may present branding elements of the robot arm manufacture, during another period the robot arm may by used to advertise for third party products or events, etc.

Applying a force to the flexible suspension element towards the upper cavity suspension rest part should be understood as the resulting force of components applied towards the first and second upper cavity parts.

According to an advantageous embodiment of the invention, said applied force is a force applied manually by hand of a work person.

The method of applying the cap is a manual process and the force needed to be applied possible to provide by hand of a standard work person working as integrator or as a robot service provider.

According to an advantageous embodiment of the invention, said method further comprises the step of demounting said cap by applying a force to said cap in the direction of said upper cavity suspension rest part or in the direction of said first upper cavity part or in the direction of said second upper cavity part.

The cap is possible to demount also by a manual process i.e. a work person is able to demount the cap e.g. to replace the cap if the cap is broken or the robot arm is determined to signal something special requiring a special cap.

According to an advantageous embodiment of the invention, said flexible suspension element is replaceable.

The flexible suspension element is rotatably mounted in a foundation element from which it can be replace if needed. In one embodiment, replacement require applying a force substantially perpendicular to the normal direction of compression and decompression of the spring.

According to an advantageous embodiment of the invention, said step of engaging said first lower protrusion with said first lower cavity furthermore includes engaging a second lower protrusion with a second lower cavity.

¶DD It should be mentioned that the protrusions may be part of the cap and the cavities may be part of the robot arm element such as a robot arm joint. Having two or more pairs of arm and cavity is advantageous in that it increases the force with which the cap is connected to the robot arm element. Put in another way, the force needed to demount the cap from the robot arm element is increased.

According to an advantageous embodiment of the invention, the method of applying a cap to a robot arm element according to any of the paragraphs ¶CC to ¶DD above, wherein the cap is a cap according to any of the paragraphs ¶AA to ¶EE above.

The drawings

Figures 2A, 2B, 2C, 2D:
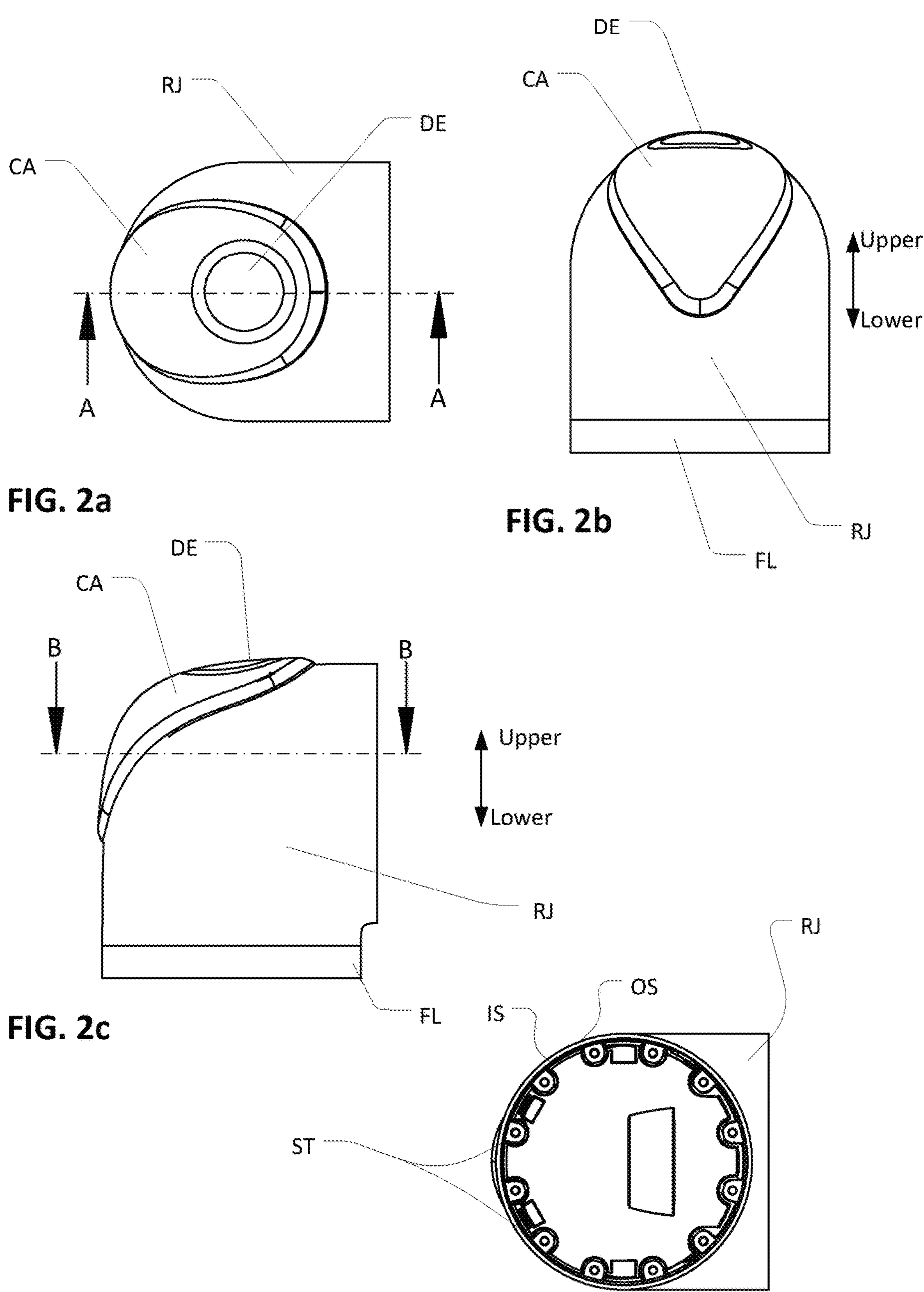
Figure 2F:
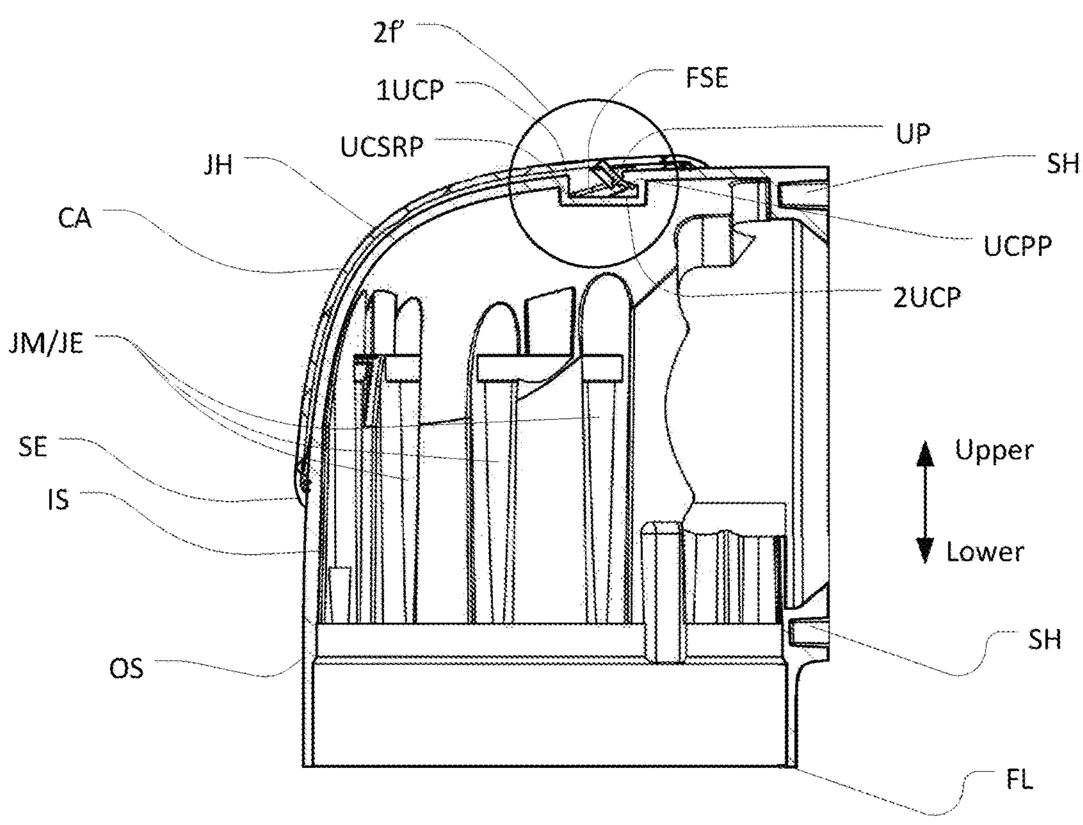
Figure 2G:
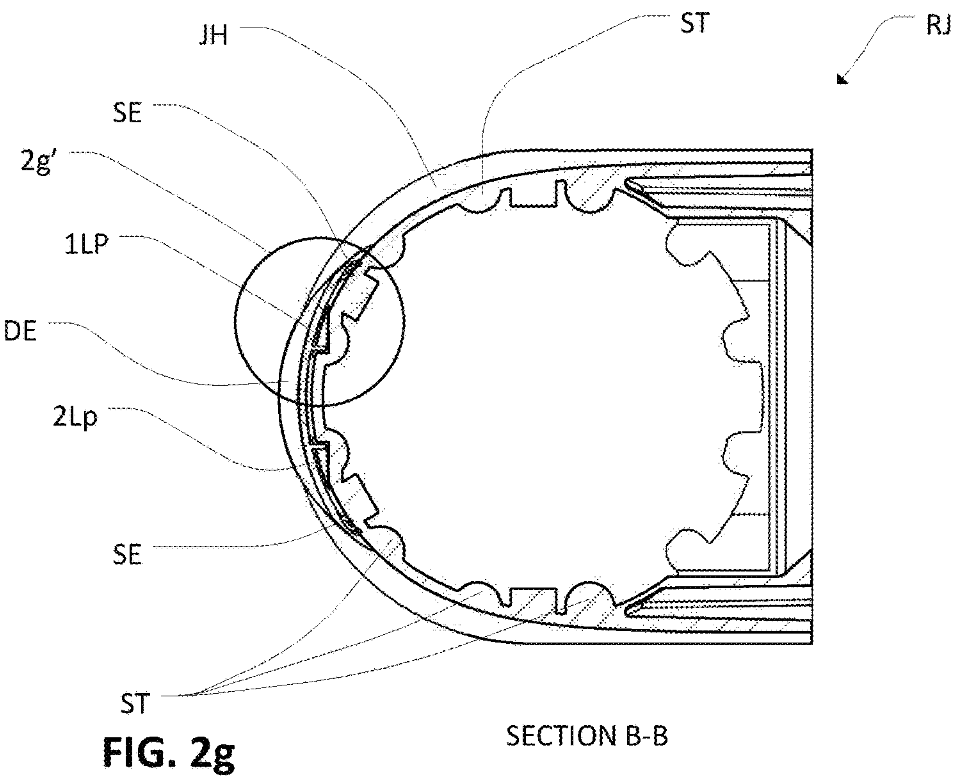
Figure 2F:
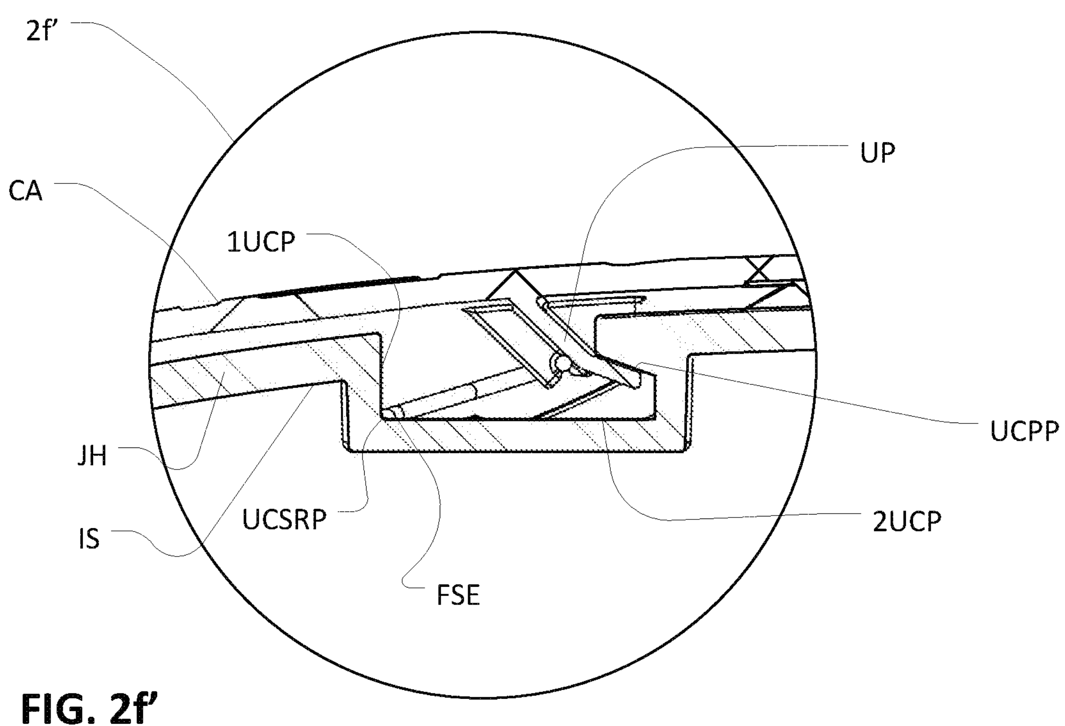
Figure 2G:
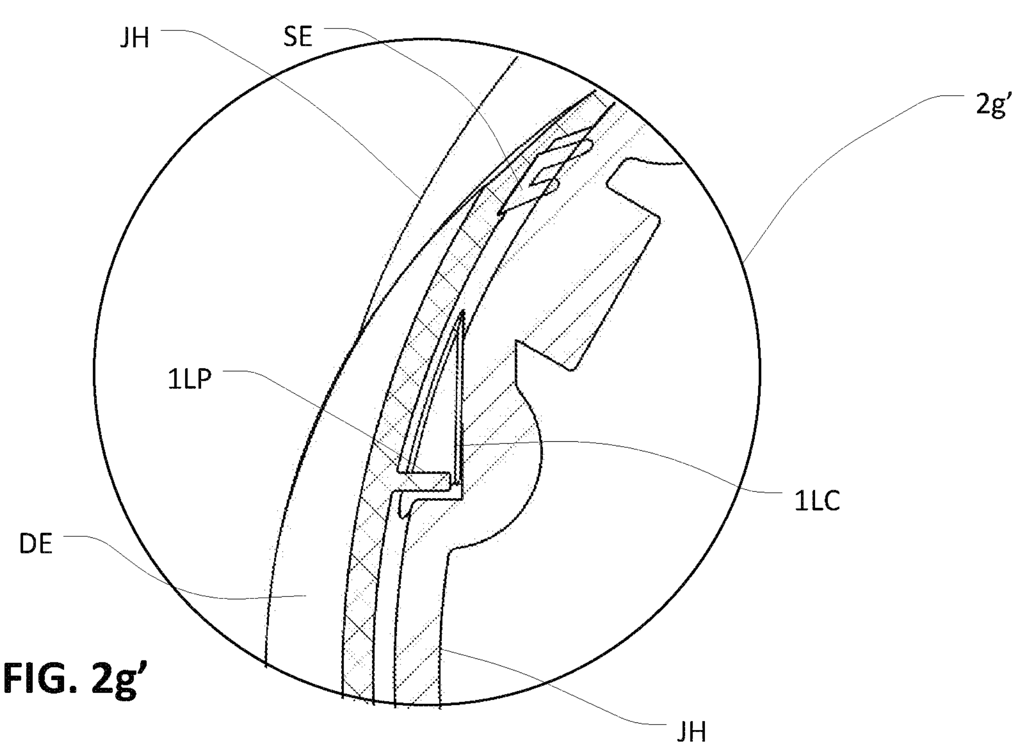
Figure 5:
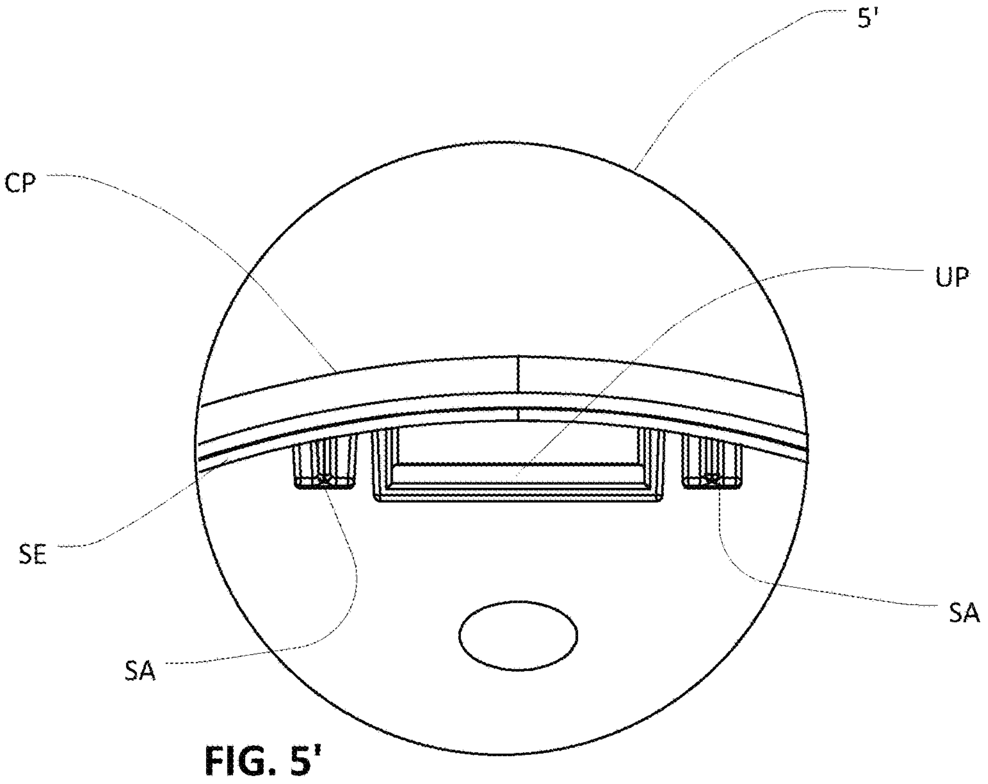
Figure 4:
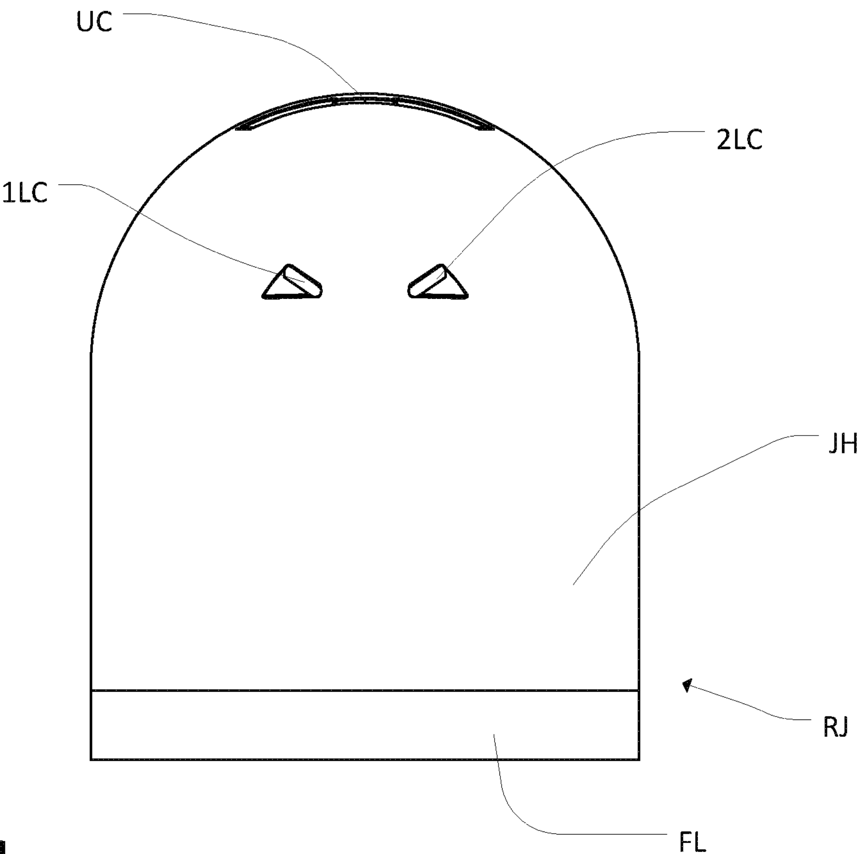
Figure 5:
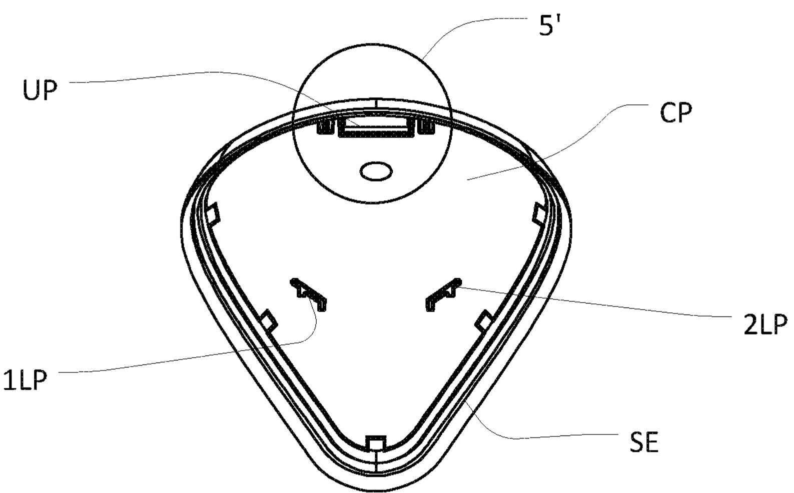
Figure 6:
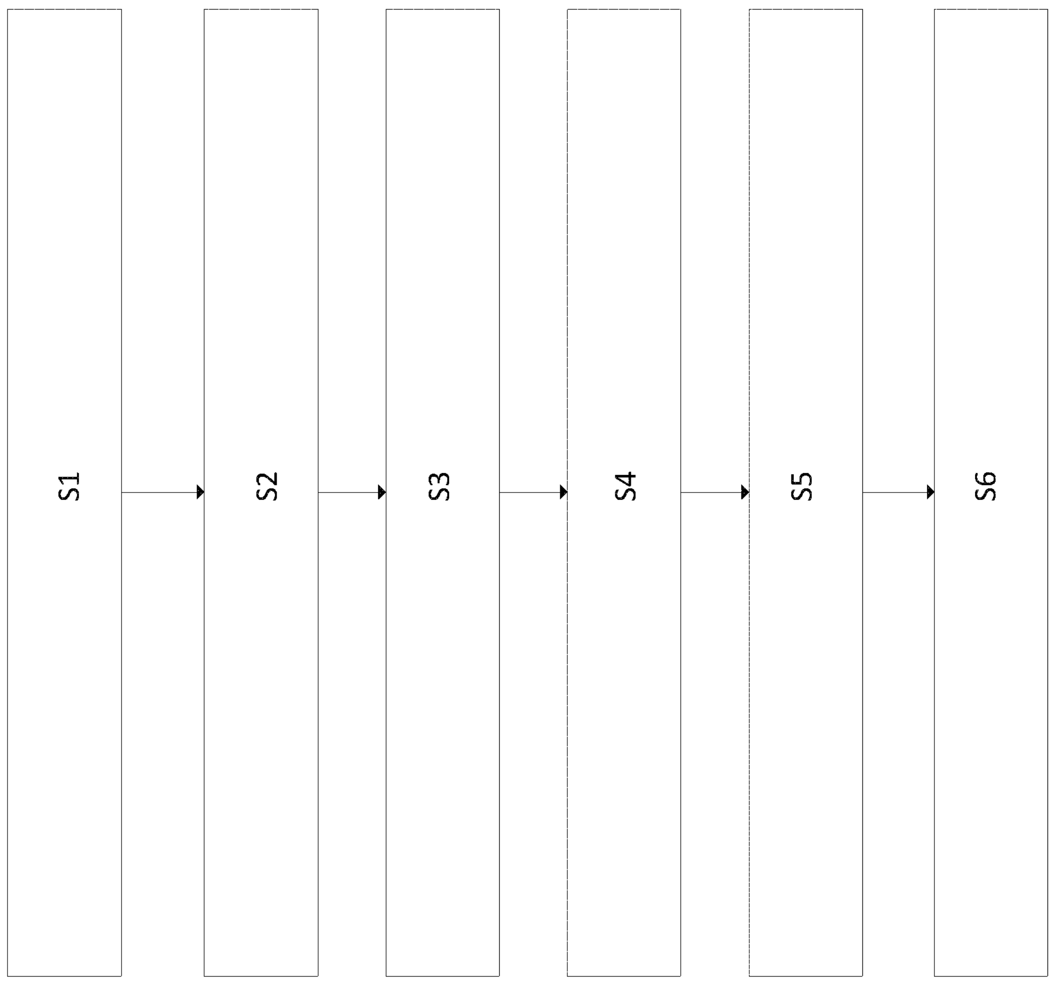

For a more complete understanding of this disclosure, reference is now made to the following brief description, taken in connection with the accompanying drawings and detailed description, wherein like reference numerals represent like parts. The drawings illustrate embodiment of the invention and elements of different drawings can be combined within the scope of the invention:

FIG. 1 illustrate a prior art robot arm,

FIGS. 2*a*, 2*b*, 2*c*, 2*d*, 2*f* and 2*g* illustrate a robot joint connected with a cap in different perspectives, FIG. 2*f'* illustrate detail 2*f* of FIG. 2*f*, FIG. 2*g'* illustrate detail 2*g'* of FIG. 2*g*, FIGS. 3*a*-3*c* illustrate a cap not connected to a robot joint in different perspectives, FIG. 3*a'* illustrate detail 3*a'* of FIG. 3*a*, FIG. 3*b'* illustrate detail 3*b'* of FIG. 3*b*, FIG. 3*c'* illustrate detail 3*c'* of FIG. 3*c*, FIG. 4 illustrate a robot joint, FIG. 5 illustrate a cap, FIG. 5' illustrate detail 5' of FIG. 5, and FIG. 6 illustrate a flow chart of a method of mounting a cap to a robot arm element.

DETAILED DESCRIPTION

The present invention is described in view of exemplary embodiments only intended to illustrate the principles and implementation of the present invention. The skilled person will be able to provide several embodiments within the scope of the claims.

FIG. 1 discloses a prior art robot arm RA comprising a number of robot arm elements such as robot joints RJ and robot links RL connecting a robot base RB to a robot tool flange RTF. The robot arm RA is controlled by a robot controller RC that can be programmed via a user interface UI, as known in the art. The robot joints RJ comprise a joint housing JH (also simply referred to as housing) having an opening closed by a joint housing lid JHL (also referred to simply as lid, cover or end cap) that is secured to the joint housing JH via a number of screws SC.

FIGS. 2*a*, 2*b*, 2*c*, 2*d*, 2*f* and 2*g* illustrate a robot joint RJ according to an embodiment of the present invention. In FIG. 2*a*, the robot joint RJ is seen in a top view, in FIG. 2*b* the robot joint RJ is seen in a front view, in FIG. 2*c* the robot joint RJ is seen in a side view and in FIG. 2*d* the robot joint is seen in a bottom view. The robot joint RJ illustrated in FIG. 2*a*-2*g* illustrates a cap CA comprising a decorative element DE.

The cap CA should be understood as an overlaying or covering structure configured to overlay and/or cover at least a part of the outer surface OS of the robot arm RA. The colour alone of the cap CA may be a decorative element DE that may signal anything from advertising, branding, affiliation to political or religious standpoint. In addition or alone, the decorative element DE of the cap CA may be a logo, word, figure or the like supporting the messaging of any of the above-mentioned areas.

In FIG. 2*b*, 2*c*, the robot joint RJ is further illustrated with a flange FL e.g. for connecting the robot joint RJ to a robot link RL. FIGS. 2*c* and 2*b* also indicate by an arrow that a part of the robot joint RJ is referred to as an upper part and another part is referred to as a lower part. This directional orientation is used to recognize the cavities which are referred to as upper and lower.

FIG. 2*g* illustrates a cross-sectional view of a robot joint RJ and a cap CA attached thereto. The cap CA comprises a decorative element DE. The cross-sectional view illustrates the robot joint RJ in a view at the line BB of FIG. 2*c*. The cross-sectional view illustrated at FIG. 2*g* illustrates first and second lower cavities 1LC, 2LC in which first and second lower protrusions 1LP, 2LP are engaged.

The curved parts denoted ST are screw towers ST which may be used to attach joint mechanics and/or joint electronics inside the joint, a flange to the joint, a link to the joint, etc. To ensure sufficient space inside the joint housing JH for joint electronics and mechanics, the first and second lower cavities 1LC, 2LC are established in the outer surface so that the space required for these cavities can be taken from the massive screw towers ST.

It is further illustrated, that the first and second lower protrusions 1LP, 2LP are engaged with the first and second lower cavities 1LC, 2LC and thereby assisting in fixing the cap CA to the outer surface OS of the joint housing JH/robot joint RJ.

FIG. 2*f* illustrates a cross-sectional view of a robot joint RJ and a cap CA attached thereto. The cross-sectional view illustrates the robot joint RJ in a view at the line AA of FIG. 2*a*. The cross-sectional view illustrated at FIG. 2*f* illustrates the upper protrusion UP and the flexible suspension element FSE engaged with the upper cavity UC thereby removable attaching the cap CA to the outer surface OS of the joint housing JH of the robot joint RJ.

The robot joint RJ illustrated at FIG. 2*f* includes a visual representation of some of the robot electronics JE and joint mechanics JM that is comprised by the joint housing JH. Also, the robot joint RJ illustrates a connecting flange FL and an indication in form of an arrow the upper and lower directions used to identify the upper and lower protrusions/cavities. The decorative element DE is not visible on FIG. 2*f* and it should be noted that the upper and lower orientation also define the orientation of letters or logos provided on the cap. Hence, a letter standing upside down on the cap has its upper part towards the upper cavity and the lower part towards the lower cavity. It is noted that a joint motor and a joint gear can be provided inside the joint housing such that an output flange driven by the joint motor and joint gear extends out of flange FL and that the output flange can be connected to another robot element. The joint housing comprises also screw holes SH for attaching another coupling flange to the upper part of the joint housing.

At the lower part of the cap and at the upper part of the cap CA where the cap is in physical connection with the outer surface OS of the joint housing JH the seal SE is illustrated. The seal SE ensure that no dust or other foreign objects can enter the space between the cap CA and the outer surface OS. It is noted, that the seal SE extend all the way around the circumference of the cap CA.

The lower protrusions 1LP, 2LP and the lower cavities 1LC, 2LC are not illustrated in FIG. 2*f*.

The upper cavity UC however is illustrated. It is noted that the upper cavity UC physically takes up space inside the joint housing JH and that this is acceptable in that none of the joint mechanics JM or joint electronics JE requires this space.

The upper cavity UC comprises a first upper cavity part 1UCP extending from the inner surface IS of the joint housing towards the center of the joint housing JH and a second upper cavity part 2UCP which is substantially perpendicular to the first upper cavity part 1UCP. Together these parts are forming an upper cavity suspension rest part UCSRP for the flexible suspension element FSE to rest, which flexible suspension element FSE in this embodiment is part of the cap CA.

The upper cavity UC further comprises an upper cavity protruding part UCPP which is configure for engaging with an upper protrusion UP, which in this embodiment is part of the cap CA.

In FIG. 2*f* 2*f*, the cap CA is connected to the joint housing JH and thus the upper protrusion UP is in an engaged position with respect to the upper cavity protruding part UCPP. This position is maintained by the flexible suspension element FSE forcing the upper protrusion UP towards the lower side of the upper cavity protruding part UCPP.

FIG. 3*a* illustrates the robot joint RJ in a side view where the upper cavity and one of the lower cavities are illustrated. The flexible suspension element FSE is illustrated alone i.e. not connected to the cap CA. The flexible suspension element FSE would typically be implemented as a spring FSE. In an embodiment, such spring FSE is of the compression type of spring. Note that the spring may also be integrated as part of the cap CA.

As seen more clearly on FIG. 3*b*, the spring FES can be demounted from the upper protrusion UP or a spring anchor SA which may be part of the upper protrusion UP or a stand-alone foundation. In FIG. 3*b*, two spring anchors are provided adjacent the upper protrusion however it is noted that the spring anchor also can be provided as a part of/build into the upper protrusion UP.

Other illustrated parts are illustrated and explained in relation to FIG. 2*f*.

As illustrated, it is possible to define a so-called lower cavity plan LCP and an upper cavity plan UCP which crosses with an angle ANG at the robot joint. This angle ANG is typically at or below 90 degrees due to the curvature of the outer surface OS of the joint housing JH.

The cavities for fastening the cap CA is separated in two or more cavities (which also may be referred to as recesses). These cavities may be referred to as upper and lower cavity. In an embodiment, at least one cavity referred to as upper cavity is located as part of the upper part and at least one cavity referred to as lower cavity is located as part of the lower part (see arrows on FIG. 2*c*). The separation of the cavities is advantageous in that hereby is ensured a sufficiently strong grip/friction determined by design of the cavities using a minimum cavity footprint on the joint housing. Further, this is advantageous in that mounting of the cap is easy in an embodiment is where it only has to engage with e.g. two lower cavities and one upper cavity just to mention one non-limiting example.

FIG. 3*b* illustrates a cap CA seen from below i.e. it is possible to all of the upper and lower protrusions. As illustrated the lower protrusions 1LP, 2LP are provided with an angled i.e. not parallel to the center axis of the robot joint RJ when mounted. The lower cavities 1LC, 2LC are angled correspondingly and thus when mounted, the position of the cap CA on the outer surface OS is predetermined mainly by the position and angle of the lower arms and cavities.

Accordingly, in an embodiment, when the lower arms and cavities are in the engaged position i.e. when the cap CA is attached to the outer surface OS, the cap CA is aligned with the center axis of the robot joint RJ.

Of course, the orientation and geometry of the cap CA and the position of the cavities and protrusions can be changed so that any desired position of the cap CA when attached to the outer surface OS can be obtained.

The spring FSE illustrated in FIG. 3*b* can be dismounted from the spring foundation which in this embodiment is coincident with the upper protrusion UP. The spring FES can be demounted by pulling the two ends thereof away from each other.

On FIG. 3*c* the angled lower cavities 1LC, 2LC are illustrated. Thus, when the lower protrusions 1LP, 2LP is engaged therein, the orientation of the cap CA is fixed.

FIG. 4 illustrates a view of the outer surface OS of the robot joint RJ and how the cavities can be established/orientated relative to each other according to an embodiment of the invention. The lower cavities 1LC, 2LC are each formed as a three angle. The three sides may be straight sides that e.g. form the cavities into the robot joint RJ in a direction which may be substantially perpendicular to the outer surface OS.

With this said, the one, two, three or more lower cavities may be formed by at least one of the sides having an acute angle with respect to the outer surface OS of the robot joint RJ. Hence, with a hook-like lower protrusion that is shaped to engage with such acute angel, the cap CA can only be mounted and demounted "from below" i.e. the lower protrusions 1LP, 2LP have to be mounted in the lower cavities 1LC, 2LC prior to the mounting of the upper protrusion UP in the upper cavity UC.

It should be noted that the cavities (and thus the associated protrusions) may have any geometric shape such as a circle, any kind or square, and triangle in any orientations, etc. The depth of the cavities into the robot joint RJ (and thus the length of the associated protrusions) may be in the range of 4 millimetres to 20 millimetres.

FIG. 5 illustrates a view of the cap CA seen from below and how the protrusions can be established/orientated relative to each other according to an embodiment of the invention. The lower protrusions 1LP, 2LP may be formed as illustrated mainly engaging with one of the three sides forming the lower cavities 1LC, 2LC of the robot joint RJ. The protrusions may be formed alternatively e.g. engaging substantially completely with one side and e.g. two-thirds of one or both of the other sides.

It should be mentioned that the cap CA and robot joint RJ illustrated in FIGS. 4 and 5 are only illustrating one way of fixating the cap CA to the robot joint RJ. Hence, the flexible suspension element FSE may e.g. be mounted on the robot joint RJ. Further, as an example, the flexible suspension element FSE may be built into the protrusions such as into the upper protrusion UP which in itself may be flexible and thus bend and snap to a customized cavity.

Note that when referring to a robot joint RJ in the above embodiments, the robot joint RJ can be replaced e.g. with a robot link RL with minor or no modifications to the principles described above. Thereby a cap CA can be mounted on a robot link RL as described in this document with respect to the robot joint RJ.

Note that the robot joint RJ or the cap CA may comprise or include universal attachments (not shown) via which it is possible to attach or hold wires or pipes that is needed e.g. by the robot tool. Such universal attachment may be implemented as a hook, an eye, custom designed grippers for custom designed electric, fluid or mechanical communication.

FIG. 6 illustrates a flow chart describing a method of connecting a cap CA to a robot joint RJ according to an embodiment of the invention.

In the first step S1, a cap CA is provided having at least one upper and one lower protrusion. The number of protrusions should match the number of cavities in the robot arm element RAE which in this embodiment is a robot joint RJ, but could also be e.g. a robot link RL. Further, the orientation of the protrusions should match the orientation of the cavities in the robot joint RJ. Turning to the cap CA illustrated in FIG. 5, two lower protrusions 1LP, 2LP and one upper protrusion UP is provided.

Further, the provided cap CA should comprise a flexible suspension element FSE such as a spring. The spring may e.g. be removable fastened in the upper protrusion UP or in a spring foundation/spring anchor as described above. Further, the spring FSE may be rotatably mounted in the upper protrusion, or spring foundation/spring anchor.

In the second step S2, a robot joint RJ is provided which, as described above, comprising cavities matching the protrusions of the cap CA. In an embodiment, the upper cavity UC comprises an upper cavity suspension rest part UCSRP.

In the third step S3, the spring FSE is positioned in the upper cavity UC preferably in the upper cavity suspension rest part UCSRP.

In the fourth step S4, a force is applied to the spring FSE e.g. by applying a force to the outer surface of the cap downwards and back i.e. against the upper cavity suspension rest part UCSRP. Hence if not the spring FSE is positioned in the upper cavity suspension rest part UCSRP in step S3, it is forces into this position in step S4.

The force may be applied by hand and to attach the cap CA to the robot joint RJ, the force may not need to be above 100 N.

In the fifth step S5, the lower protrusions 1LP, 2LP are positioned in the lower cavities 1LC, 2LC. Further, the upper protrusion UP is positioned under or at least below the level of the underside of the upper cavity protruding part UCPP such that when the force is released in step S6, the upper side of the upper protrusion UP engage with the underside of the upper cavity protruding part UCPP.

In the sixth step S6, the force is released from the spring (e.g. by removing the hand applying the force) thereby allowing the spring to return towards its rest position and thereby maintain engagement between the upper protrusion UP and the upper cavity suspension rest part UCSRP and between the lower protrusions 1LP, 2LP and the lower cavities 1LC, 2LC.

After the sixth step, the cap CA is mounted to the robot joint RJ. If the cap CA later is to be demounted from the robot joint RJ, this can be done, again manually, by applying a force downwards and back or back i.e. away from the upper cavity suspension rest part UCSPR. The force required to demount the cap CA from the robot joint RJ may be similar to the force needed to mount the cap, hence a force which typically is below 100 N.

From the above it is now clear that the invention relates to a cap CA which is possible to mount and subsequently demount from a robot arm element such as a robot joint RJ or robot link RL. The cap CA is mounted by engaging an upper protrusion UP preferably of the cap CA with an upper cavity protruding part UCPP of an upper cavity UC preferably of the robot joint RJ. Further one or more lower protrusions 1LP, 2LP are engaged with one or more lower cavities 1LC, 2LC. When engaged, the engaged position of protrusions in cavities is maintained by a flexible suspension element FSE such as a spring. The position of the protrusions in the cavities is obtained by applying a force to the spring and the engaged position is maintained by releasing this force.

The invention has been exemplified above with the purpose of illustration rather than limitation with reference to specific examples of methods and robot systems. Details such as a specific method and system structures have been provided in order to understand embodiments of the invention. Note that detailed descriptions of well-known systems, devices, circuits, and methods have been omitted so as to not obscure the description of the invention with unnecessary details.

LIST

RA. Robot arm
RJ. Robot joint
RL. Robot link

RB. Robot base
RTF. Robot tool flange
RC. Robot controller
UI. User interface
JH. Joint housing
JHL. Joint housing lid
SC. Screws
DE. Decorative element
FL. Flange
OS. Outer surface
IS. Inner surface
ST. Screw tower
CA. Cap
1LC. First lower cavity
2LC. Second lower cavity
1LP. First lower protrusion
2LP. Second lower protrusion
UC. Upper cavity
UP. Upper protrusion
SE. Seal
FSE. Flexible suspension element
UCPP. Upper cavity protruding part
FUCP. First upper cavity part
SUCP. Second upper cavity part
UCSRP. Upper cavity suspension rest part
JE. Joint electronics
JM. Joint mechanics
UAA. Universal attachment
LCP. Lower cavity plane
UCP. Upper cavity plane
ANG. Angle.

The invention claimed is:

1. A system comprising:

a cap that is removably connectable to an element of a robotic arm, the element comprising an upper cavity comprising a protruding part and a lower cavity, the cap comprising:

an upper protrusion; and a lower protrusion; and a flexible suspension element, wherein:

the upper protrusion is connectable to the upper cavity;

the lower protrusion is connectable to the lower cavity; and the flexible suspension element is flexible relative to the upper protrusion to hold the upper protrusion in the upper cavity by forcing the upper protrusion against the protruding part of the upper cavity.

2. The system of claim 1, wherein the system comprises the element, wherein the element comprises a robotic joint or a robotic link.

3. The system of claim 2, wherein the robotic joint comprises a single hollow tubular element comprising two openings.

4. The system of claim 2, wherein a width of the cap is less than a diameter of the robotic joint.

5. The system of claim 2, wherein the upper cavity extends into an interior of the robotic joint.

6. The system of claim 2, wherein the robotic joint comprises the lower cavity.

7. The system of claim 6, wherein the lower cavity is a first lower cavity; and wherein the robotic joint comprises a second lower cavity.

8. The system of claim 7, wherein the robotic joint comprises a screw tower.

9. The system of claim 1, wherein the cap comprises an arm identification cap.

10. The system of claim 1, wherein at least a part of the cap has a shape that is complementary to a shape of an outer curvature of the element.

11. The system of claim 1, wherein the cap comprises a seal.

12. The system of claim 1, wherein the cap comprises a universal attachment arrangement.

13. The system of claim 1, wherein the cap is shock-absorbing.

14. The system of claim 1, wherein the cap is made of Acrylonitrile Butadiene Styrene, Polycarbonate, or Polylactic acid.

15. The system of claim 1, wherein the upper cavity comprises a first upper cavity part and a second upper cavity part; and wherein the upper cavity comprises an upper cavity suspension rest part for holding the flexible suspension element via the first upper cavity part and the second upper cavity part.

16. The system of claim 1, wherein the cap comprises the flexible suspension element.

17. The system of claim 1, wherein the upper cavity comprises the flexible suspension element.

18. The system of claim 1, wherein an angle between a lower cavity plane of the lower cavity and an upper cavity plane of the upper cavity is between 80 degrees and 125 degrees.

19. The system of claim 1, wherein the upper protrusion and the upper cavity are configured to be aligned when the cap and the element are connected.

20. The system of claim 1, wherein the flexible suspension element comprises a compression spring.

21. The system of claim 1, wherein the flexible suspension element is rotatably mounted in the cap.

22. A method of applying a cap to an element of a robotic arm, where the cap comprises an upper protrusion and a lower protrusion, where the element of the robotic arm comprises an outer surface comprising an upper cavity and a lower cavity, and where the upper cavity comprises an upper cavity protruding part and an upper cavity suspension rest part, the method comprising:

causing a flexible suspension element to contact the upper cavity suspension rest part;

applying a force to the flexible suspension element towards the upper cavity suspension rest part;

causing the upper protrusion to engage with the upper cavity protruding part and the lower protrusion to engage with the lower cavity; and releasing the force (i) to allow the flexible suspension element to maintain engagement of the upper protrusion with the upper cavity protruding part and (ii) to maintain engagement of the lower protrusion with the lower cavity.

23. The method of claim 22, wherein the force is applied manually.

24. The method of claim 23, further comprising:

removing the cap by applying a force to the cap toward the upper cavity suspension rest part, or toward a first upper cavity part of the upper cavity, or toward a second upper cavity part of the upper cavity.

25. The method of claim 24, wherein the flexible suspension element is replaceable.

26. The method of claim 25, further comprising engaging a second lower protrusion of the cap with a second lower cavity of the element of the robotic arm.

27. A system comprising:

a cap that is removably connectable to an element of a robotic arm, the element comprising an inner surface and an outer surface, the outer surface comprising an upper cavity and a lower cavity; and a flexible suspension element;

where the cap comprises:

an upper protrusion; and a lower protrusion; and wherein:

the upper protrusion is connectable to the upper cavity;

the lower protrusion is connectable to the lower cavity; and the flexible suspension element is configured to perform one or both of the following functions: (i) to force at least a part of the upper protrusion against a part of the upper cavity or (ii) to force at least a part of the lower protrusion against a part of the lower cavity.

28. The system of claim 27, wherein the element comprises a robotic joint or a robotic link.

29. The system of claim 28, wherein the robotic joint comprises a single hollow tubular element comprising two openings.

30. The system of claim 28, wherein a width of the cap is less than a diameter of the robotic joint.

31. The system of claim 28, wherein the upper cavity extends into an interior of the robotic joint.

32. The system of claim 27, wherein the cap comprises an arm identification cap.

33. The system of claim 27, wherein at least a part of the cap has a shape that is complementary to a shape of an outer curvature of the element.

34. The system of claim 27, wherein the cap comprises a seal.

35. The system of claim 27, wherein the cap comprises a universal attachment arrangement.

36. The system of claim 27, wherein the cap is shock-absorbing.

37. The system of claim 27, wherein the cap is made of Acrylonitrile Butadiene Styrene, Polycarbonate, or Polylactic acid.

38. The system of claim 27, wherein an angle between a lower cavity plane of the lower cavity and an upper cavity plane of the upper cavity is between 80 degrees and 125 degrees.

39. The system of claim 38, wherein the upper protrusion and the upper cavity are configured to be aligned when the cap and the element are connected.

40. The system of claim 27, wherein the flexible suspension element comprises a compression spring.

41. The system of claim 27, wherein the flexible suspension element is rotatably mounted in the cap.

* * * * *